(12) United States Patent
Reinke et al.

(10) Patent No.: US 7,494,516 B2
(45) Date of Patent: Feb. 24, 2009

(54) HIGHLY INTEGRATED FUEL PROCESSOR FOR DISTRIBUTED HYDROGEN PRODUCTION

(75) Inventors: Michael J. Reinke, Franklin, WI (US); Jeroen Valensa, Muskego, WI (US); Todd Bandhauer, Racine, WI (US); Nicholas Siler, Franksville, WI (US); Mark G. Voss, Franksville, WI (US); Michael McGregor, Racine, WI (US); Dennis C. Granetzke, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 539 days.

(21) Appl. No.: 11/059,005

(22) Filed: Feb. 16, 2005

(65) Prior Publication Data

US 2005/0217180 A1 Oct. 6, 2005

Related U.S. Application Data

(60) Provisional application No. 60/545,054, filed on Feb. 17, 2004.

(51) Int. Cl.
*B01J 8/00* (2006.01)
(52) U.S. Cl. .................................... 48/127.9
(58) Field of Classification Search ............... 48/127.9
See application file for complete search history.

(56) References Cited

U.S. PATENT DOCUMENTS

| | | | |
|---|---|---|---|
| 4,985,230 A | 1/1991 | Baden et al. | |
| 5,401,589 A | 3/1995 | Palmer et al. | |
| 5,458,857 A | 10/1995 | Collins et al. | |
| 5,861,137 A | 1/1999 | Edmund | |
| 6,126,908 A | 10/2000 | Clawson et al. | |
| 6,221,117 B1 | 4/2001 | Edmund et al. | |
| 6,245,303 B1 | 6/2001 | Bentley et al. | |
| 6,284,157 B1 | 9/2001 | Eliasson et al. | |
| 6,342,197 B1 | 1/2002 | Senetar et al. | |
| 6,375,924 B1 | 4/2002 | Towler et al. | |
| 6,402,988 B1 | 6/2002 | Gottzmann et al. | |
| 6,409,974 B1 | 6/2002 | Towler et al. | |
| 6,413,479 B1 | 7/2002 | Kudo et al. | |
| 6,436,363 B1 | 8/2002 | Hwang et al. | |
| 6,497,856 B1 | 12/2002 | Lomax, Jr. et al. | |
| 6,506,359 B1 | 1/2003 | Maruko | |
| 6,524,550 B1 | 2/2003 | Chintawar et al. | |

(Continued)

FOREIGN PATENT DOCUMENTS

DE 1 232 304 1/1967

(Continued)

*Primary Examiner*—Walter D Griffin
*Assistant Examiner*—Natasha Young
(74) *Attorney, Agent, or Firm*—Wood, Phillips, Katz, Clark & Mortimer

(57) ABSTRACT

A recuperative heat exchanger (36) is provided for use in a fuel processor (20), the heat exchanger (36) transferring heat from a fluid flow (34) at one stage of a fuel processing operation to the fluid flow (32) at another stage of the fuel processing operation. The heat exchanger (36) includes a housing (56) defining first and second axially extending, concentric annular passages in heat transfer relation to each other; a first convoluted fin (70) located in the first passage to direct the fluid flow therethrough; and a second convoluted fin (72) located in the second passage to direct the fluid flow therethrough.

8 Claims, 12 Drawing Sheets

U.S. PATENT DOCUMENTS

| | | |
|---|---|---|
| 6,548,029 B1 | 4/2003 | Towler et al. |
| 6,576,158 B1 | 6/2003 | Christensen et al. |
| 6,623,719 B2 | 9/2003 | Lomax, Jr. et al. |
| 6,713,040 B2 | 3/2004 | Ahmed et al. |
| 2003/0041519 A1 | 3/2003 | Maruko |
| 2003/0044331 A1* | 3/2003 | DeBellis et al. ............ 422/198 |
| 2003/0161768 A1 | 8/2003 | Kawamoto et al. |

FOREIGN PATENT DOCUMENTS

| | | |
|---|---|---|
| DE | 27 42 070 A1 | 3/1979 |
| DE | 30 34 193 A1 | 4/1982 |
| DE | 35 32 930 A1 | 5/1986 |
| DE | 36 05 244 A1 | 8/1987 |
| DE | 691 26 321 T2 | 4/1998 |
| EP | 1 197 261 A2 | 4/2002 |

\* cited by examiner

LOW PRESSURE VESSEL HEAD
108
54
108
60
136
WELDED CONNECTIONS
LOWER OUTER SHELL HEAD
134
AIR/PSA OFF-GAS INLET TUBE

138
WELDED CONNECTIONS
OUTER SHELL
WELDED CONNECTIONS
138
SMR/COMBUSTOR FINS OMMITTED FOR CLARITY

NATURAL GAS COIL
130
FEED MIX INLET TUBE
42
140
UPPER PRESSURE VESSEL HEAD
66
STEAM COIL
62
60
58
54
44

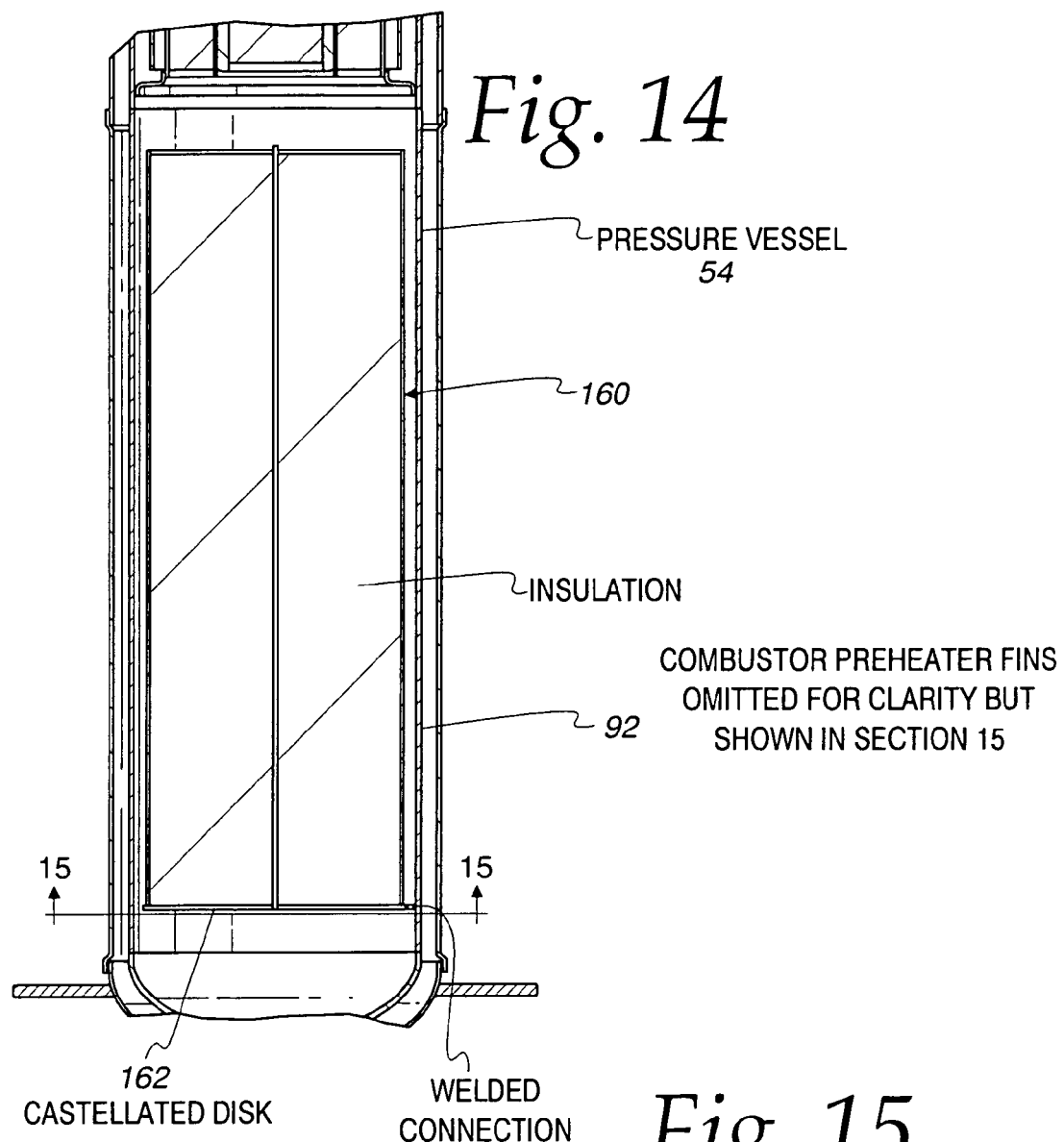
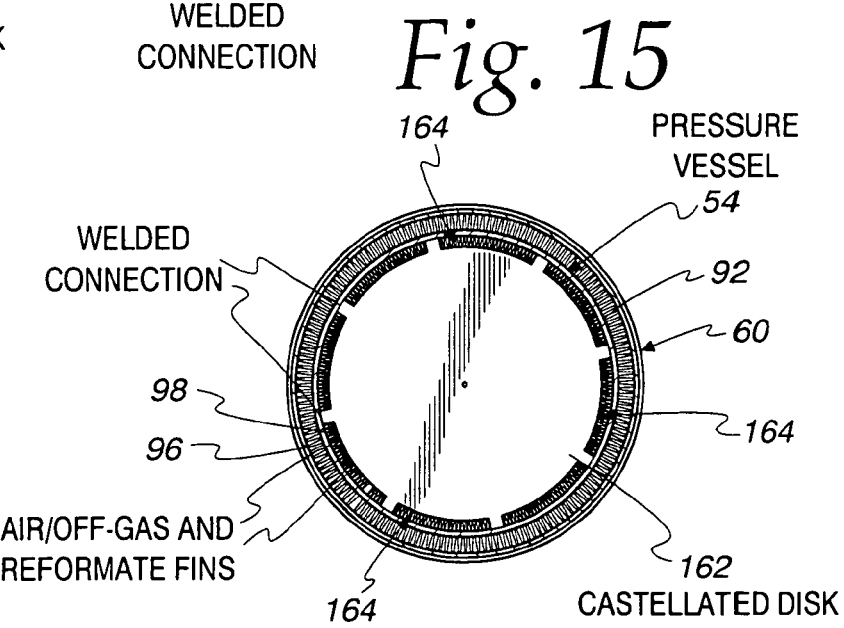

HIGHLY INTEGRATED FUEL PROCESSOR FOR DISTRIBUTED HYDROGEN PRODUCTION

FIELD OF THE INVENTION

This invention relates to fuel processors, and in more particular applications to fuel processors for distributed hydrogen production.

BACKGROUND OF THE INVENTION

It has been well-established that a critical key to the long-term success of fuel cell vehicles is the development of a hydrogen infrastructure. Fuel cell vehicles are projected by many to be the eventual replacement of, or at the very least supplement to, the internal combustion engine vehicle. This is driven primarily by the growing concerns over greenhouse gas and air pollutant emissions, long-term availability of fossil fuels, and energy supply security. The proton exchange membrane (PEM) fuel cells which are the focus of almost all the current efforts towards the development of commercially viable fuel cell vehicles require hydrogen as a fuel. Virtually all efforts towards the on-board production of hydrogen from more portable hydrocarbon fuels have been abandoned in recent years, and almost all fuel cell vehicle manufacturers are currently focusing on refueling the vehicles with high-purity liquid or gaseous hydrogen.

The means by which hydrogen can be produced in large quantities are well understood. Steam reforming of methane is the primary means by which hydrogen is currently being produced on an industrial scale. Today, about half of the world production of hydrogen is used in oil refineries, mainly for the production of automotive fuels. Another 40% is consumed in the commercial production of ammonia. However, the annual production volume of hydrogen in the United States is comparable to only two days worth of gasoline consumption. Furthermore, hydrogen is currently being produced predominantly on a large industrial scale. For a successful transportation infrastructure, the hydrogen refueling network must be well-distributed. Hydrogen is, however, very problematic to distribute. Gaseous hydrogen has one of the lowest energy densities, making it difficult to transport in the amounts that would be required for a transportation fuel cell infrastructure. Distributing hydrogen in liquid form is also difficult—it requires very low temperatures (22K), and even in liquid form hydrogen has a low energy density. Because of these concerns, it can be reasonably concluded that a hydrogen infrastructure capable of supplying the refueling needs of fuel cell vehicles will need to rely on the distributed production of high-purity hydrogen.

The widely distributed hydrogen production necessary for a transportation fuel cell infrastructure is much smaller than the typical refinery or ammonia-producing hydrogen production scale. Various means by which high-purity hydrogen can be economically produced at this small scale are currently being pursued. One such means of production is to apply, on a smaller scale, the well-understood methods of producing a hydrogen at the current large scales. The predominant method of producing a hydrogen at large scales is by steam reforming natural gas (methane) over a catalyst. The steam reforming reaction produces hydrogen and carbon monoxide as follows:

$$CH_4 + H_2O \rightarrow 3H_2 + CO$$

The steam reforming reaction is highly endothermic, requiring 206 kJ of energy per mole of methane consumed. Some of the CO produced is converted to $CO_2$ via the associated water-gas shift reaction:

$$CO + H_2O \rightarrow CO_2 + H_2$$

This reaction is exothermic, and liberates 41 kJ of energy per mole of CO consumed. Steam reforming of methane is typically carried out at temperatures in the range of 700° C.-900° C. Since the reaction is endothermic, heat must be supplied to the reactor. This is typically accomplished by loading the catalyst into a series of tubes which are placed in a furnace. The hydrogen can be extracted from the steam reforming product gas (reformate) through various well-understood means, such as metal membrane or pressure swing adsorption (PSA).

It has long been understood that in order to make steam reforming of natural gas feasible at the smaller scales required for a distributed production of hydrogen for fuel cell vehicles, a greater integration between the heat-producing combustor and the endothermic steam reforming reaction is needed. Attempts to build such systems have met with some success in the past, but the performance efficiency has always been limited by the ability to transfer the required heat into the steam reforming reaction without generating extremely high (>1000° C.) metal temperatures.

SUMMARY OF THE INVENTION

Embodiments of the invention are disclosed herein in a highly integrated steam reforming fuel processor, which in combination with a Pressure Swing Adsorption (PSA) can deliver high purity hydrogen at a scale which is well-suited to the distributed production of hydrogen for a transportation fuel cell infrastructure. This fuel processor overcomes the heat transfer limitations of previous designs, and is thereby capable of achieving a high level of hydrogen product efficiency without extremely high metal temperatures.

In accordance with one feature of the invention, a recuperative heat exchanger is provided for use in a fuel processor, the heat exchanger transferring heat from a fluid flow at one stage of a fuel processing operation to the fluid flow at another stage of the fuel processing operation.

According to one feature of the invention, a fuel processing unit includes a steam reformer and a recuperative heat exchanger, the heat exchanger connected to the steam reformer to direct a fluid flow to the steam reformer, the fluid flow being a steam/fuel feed mix to be reformed in the steam reformer into a reformate, the steam reformer connected to the heat exchanger to direct the fluid flow back to the heat exchanger after it has been reformed into the reformate.

In accordance with one feature, the heat exchanger includes a housing defining first and second axially extending, concentric annular passages in heat transfer relation to each other; a first convoluted fin located in the first passage to direct the fluid flow therethrough; and a second convoluted fin located in the second passage to direct the fluid flow therethrough.

In one feature, the recuperative heat exchanger further includes a cylindrical water-gas shift reactor extending centrally through the housing at a location radially inward from the first and second passages.

In accordance with one feature of the invention, the heat exchanger includes a cylindrical wall; a first convoluted fin bonded to a radially inwardly facing surface of the wall, the convolutions of the first convoluted fin extending axially to direct the fluid flow through the heat exchanger; and a second convoluted fin bonded to a radially outwardly facing surface of the wall, the convolutions of the second convoluted fin extending axially to direct the fluid flow through the heat exchanger.

Other objects, features, and advantages of the invention will become apparent from a review of the entire specification, including the appended claims and drawings.

BRIEF DESCRIPTION OF THE DRAWINGS

FIG. 14 is an enlarged view of the portion encircled by line 14-14 in FIG. 7;

FIG. 15 is a view taken from line 15-15 in FIG. 14; and

DETAILED DESCRIPTION OF THE PREFERRED EMBODIMENT

Figure 1:
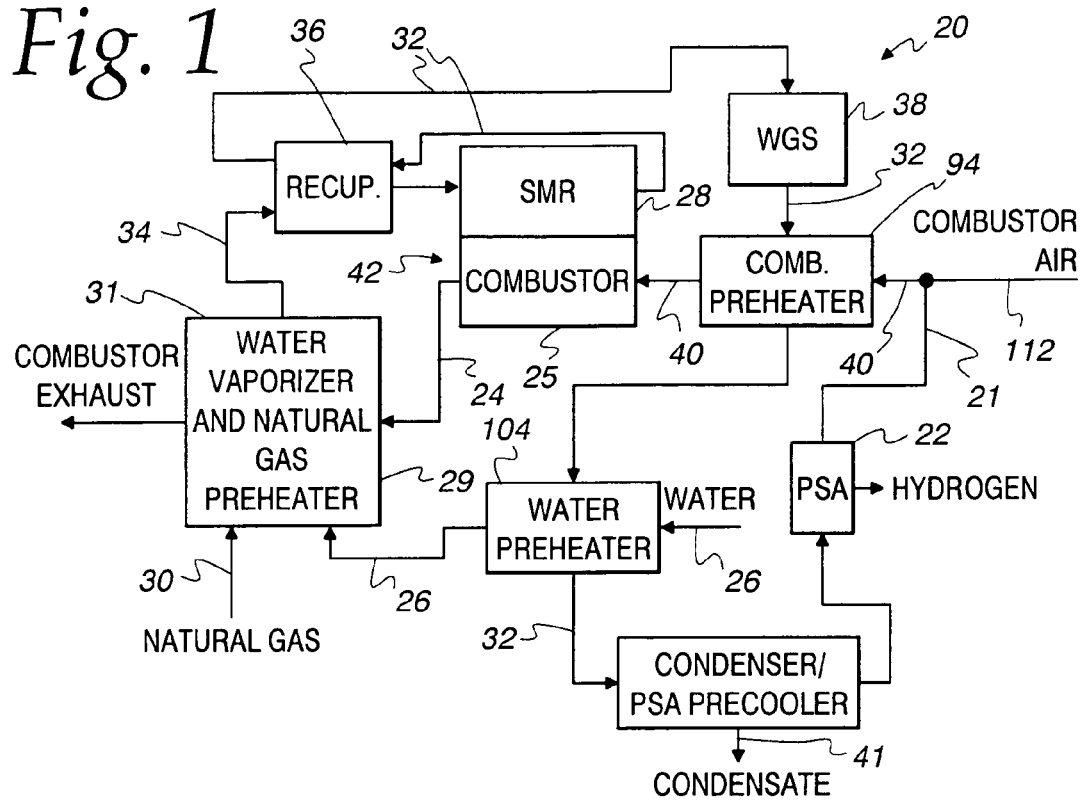
FIG. 1 is a diagrammatic representation of a fuel processing system embodying the invention.

A system schematic of a highly integrated fuel processor 20 is shown in FIG. 1. In this system, the only source of fuel required for the combustor is the hydrogen-depleted off gas 21 from the Pressure Swing Absorption (PSA) 22. The high-pressure side of the PSA 22 is preferably designed to operate at 100 psig, while the low-pressure side of the PSA is designed to operate at near-atmospheric pressure (~1 psig). Heat recovered from a combustor exhaust 24 of combustor 25 is used in a vaporizer 29 to vaporize and superheat a water feed 26 for a steam reformer 28, as well as to preheat a natural gas feed 30 for the steam reformer 28 in a fuel preheater 31. Heat is recovered from a reformate stream 32 exiting the steam reformer 28 and is used to further preheat the now mixed steam-natural gas feed 34 in a recuperative heat exchanger 36. A water-gas shift (WGS) reactor 38 is used to increase hydrogen production. Downstream of the water-gas shift reactor 38, additional heat is recovered from the reformate stream 32 and is used to preheat a combustor feed 40 and the water feed 26 to the vaporizer 29. The reformate stream 32 is cooled to a temperature suitable for the PSA 22, and excess water is condensed out. The heat removed in this process is at a fairly low temperature, and is not recovered. The condensate 41 can be recovered and reused, if it is desirable to do so.

Figure 2:
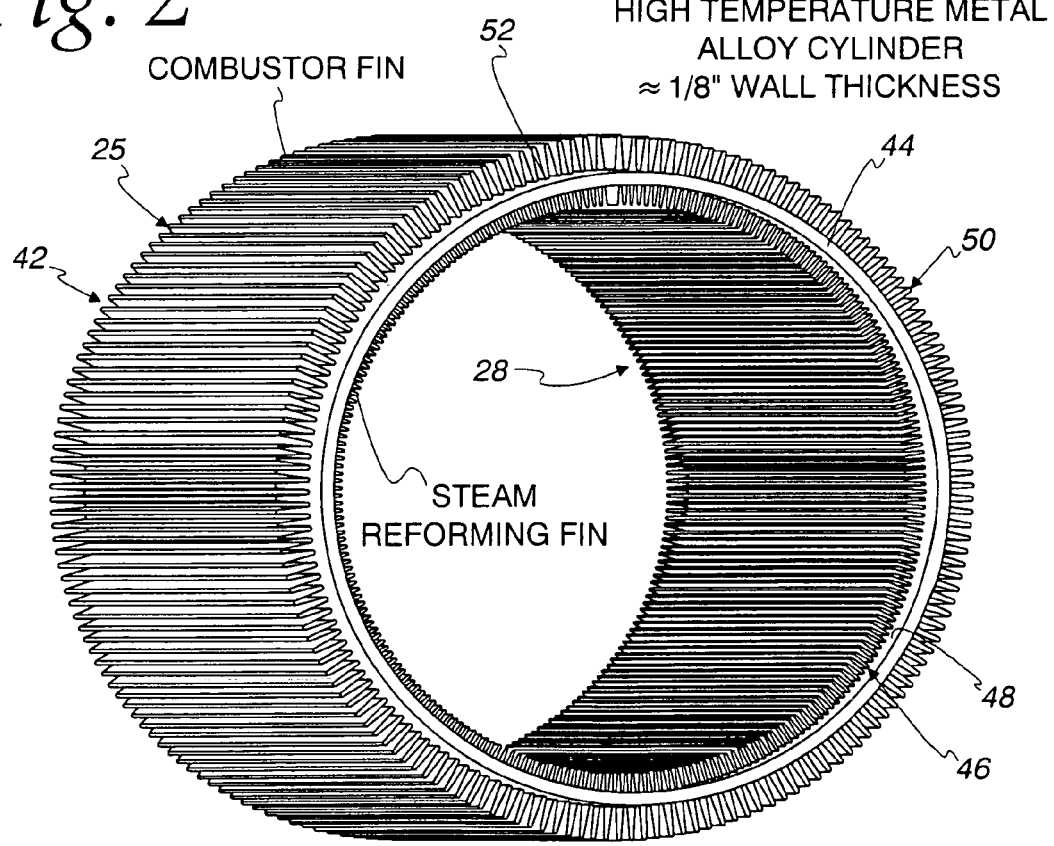
FIG. 2 is a perspective view of an integrated steam reformer/combustor assembly of the invention.

Optimized hydrogen conversion is accomplished in this design through the use of an integrated steam reformer and combustor 42 which integrates the reformer 28 and the combustor 25 and which has highly effective heat transfer characteristics. The integrated steam reformer and combustor 42 will hereafter in this description be referred to as the SMR reactor 42. As best seen in FIG. 2, the SMR reactor 42 is constructed as a metal cylinder 44 of a high-temperature alloy with a first convoluted fin structure 46 brazed to an inner surface 48 along the entire circumference of the cylinder 44, and a second convoluted fin structure 50 brazed to an outer surface 52 along the entire circumference of the cylinder 44. The inside fin 46 is wash-coated with a steam reforming catalyst, and the outside fin 50 is wash-coated with a catalyst capable of oxidizing both hydrogen and methane. The cylinder 44 is of sufficient thickness to be used as a portion of a pressure vessel 54, shown in FIG. 3, which contains the high-pressure steam reformer feed 34 and reformate stream 32, shown in FIG. 4. Cylindrical metal sleeves 56 and 58 (not shown in FIG. 2) serve to channel the flow through the coated fin structures 46 and 50, respectively.

Figure 3:
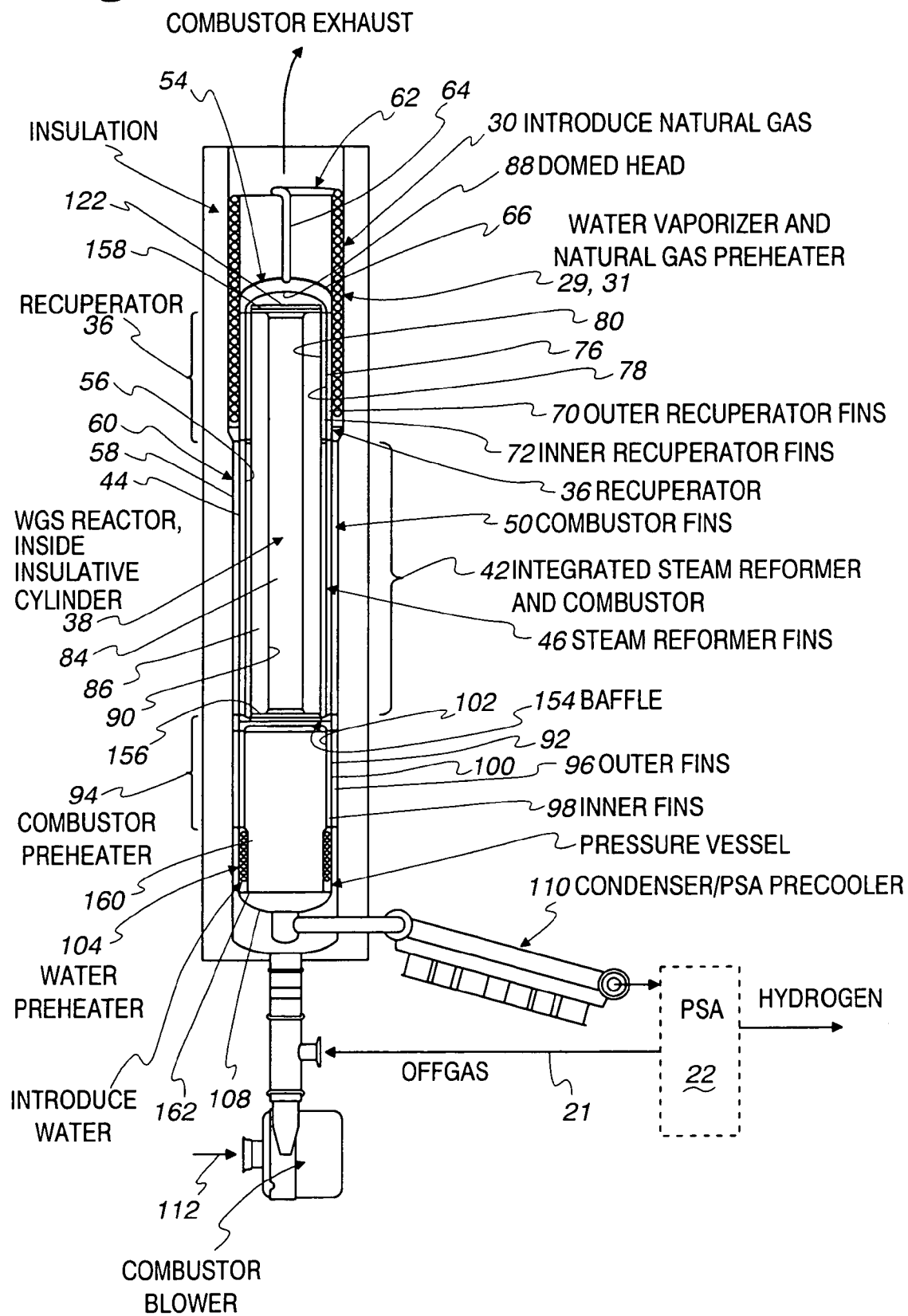
FIG. 3 is a section view of one embodiment of an integrated fuel processing unit of the invention.
Figure 4:
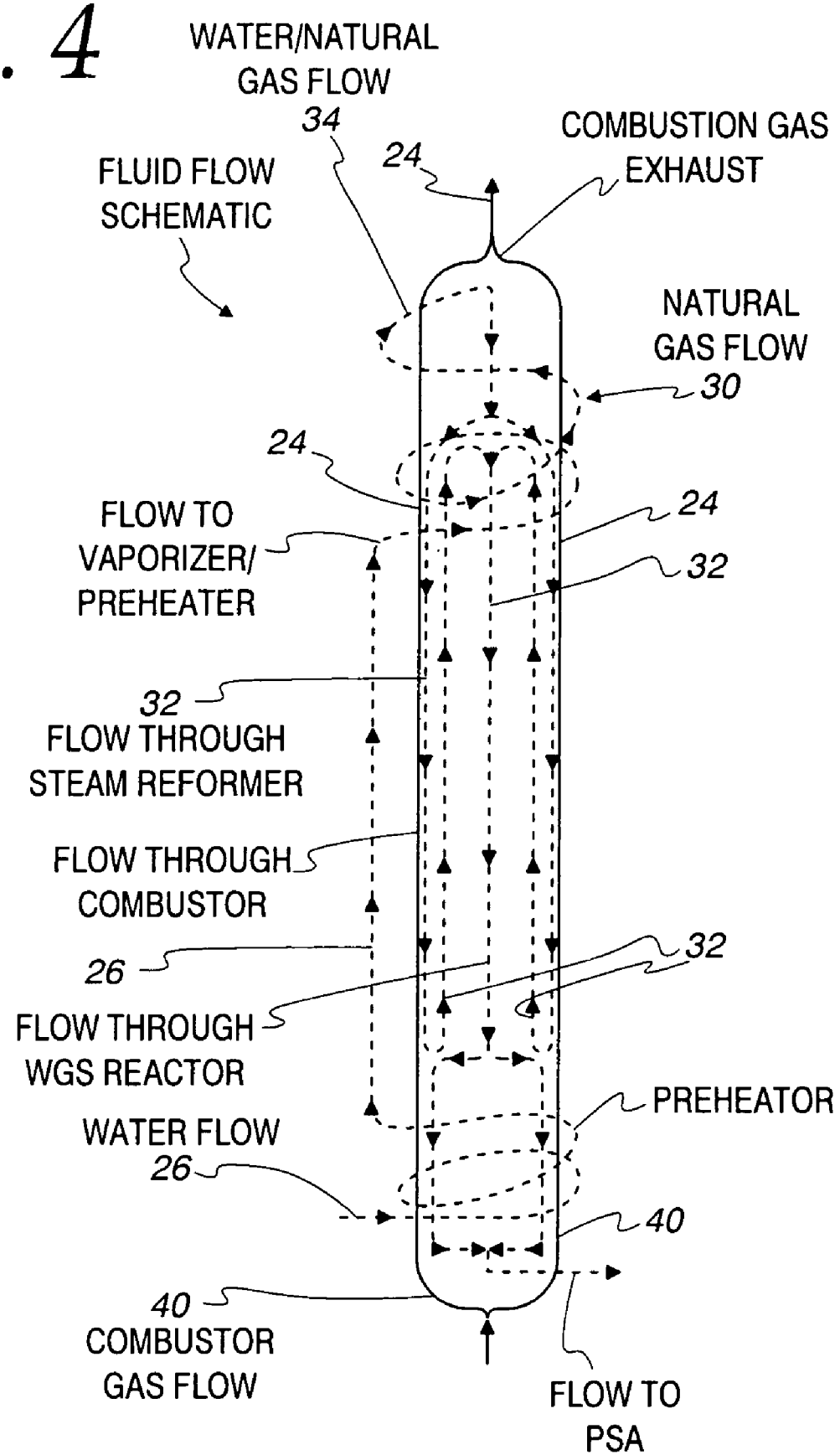
FIG. 4 is a flow schematic showing the fluid flows through the fuel processing unit of FIG. 3.
Figure 5:
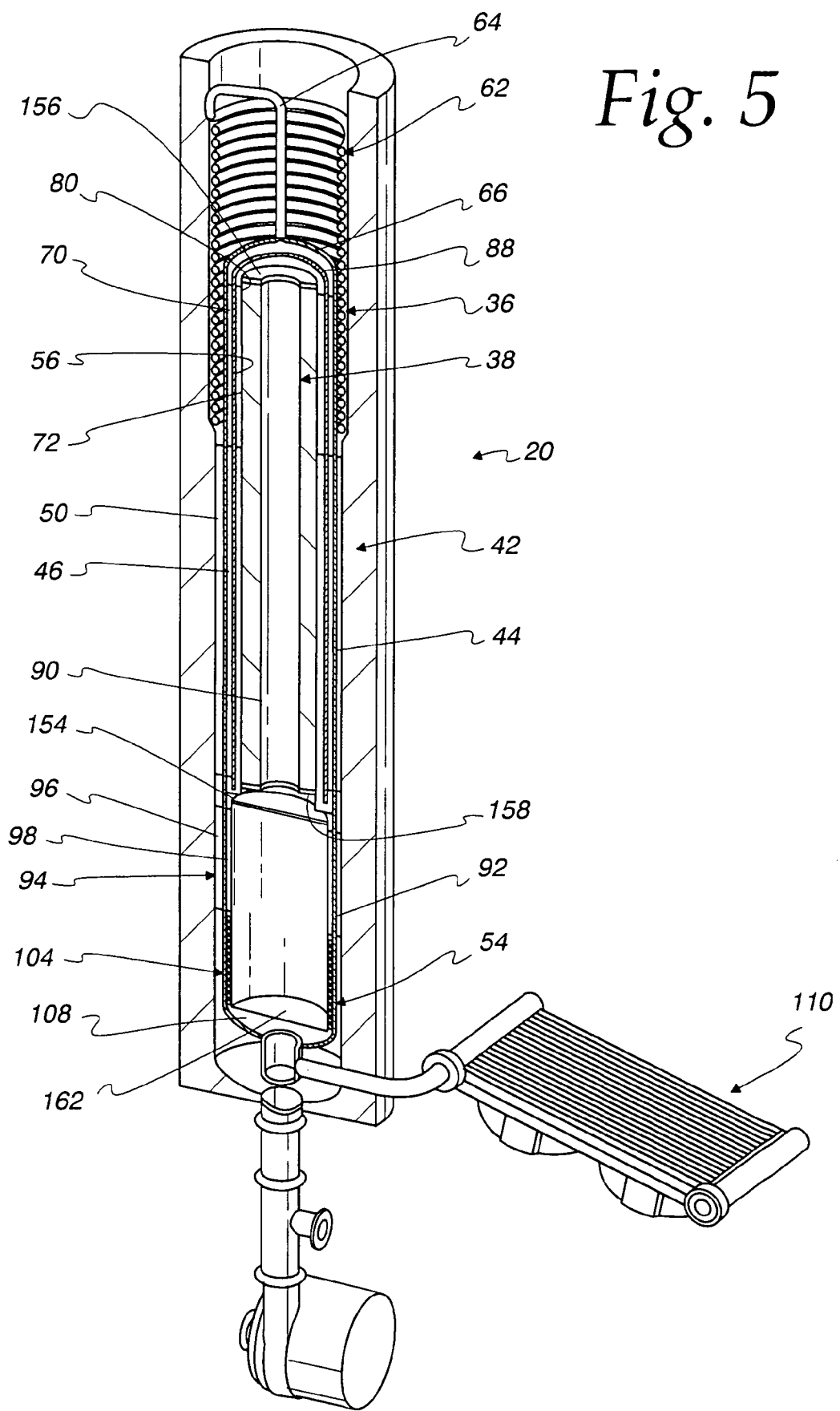
FIG. 5 is a sectioned, perspective view from above of the integrated fuel processing unit of FIG. 3.

FIGS. 3 and 4 show one embodiment of the fully assembled fuel processor 20. The fuel processor 20 consists of the cylindrical high-pressure vessel 54 situated within and coaxial to a low-pressure cylinder or vessel 60. The water and natural gas feeds 26,30 for the steam reformer 28 are vaporized (in the case of the water) and preheated in a coiled tube 62 which is situated between the two cylinders 44,60. The preheated feed 34 enters the pressure vessel 54 through a tube 64 at a top domed head 66 of the vessel 54 and passes into the recuperator 36.

The construction of the recuperator 36 is similar to the SMR reactor 42, with a highly augmented fin structures 70 and 72 (such as a louvered or lanced-offset fin) brazed to both the outside and inside surfaces 76 and 78 of the cylinder 56. The flows will again be channeled through these fin structures 70,72 by cylindrical metal sleeves 44 and 80. The recuperator cylinder 56 and fins 70,72 are sized such that the annular area encompassing the fin 70 bonded to the outer surface 76 is the same as the annular area encompassing the steam reforming catalyst coated fin 46 in the SMR reactor 42. The recuperator cylinder 56 extends past the ends of the fins 70,72 on one side by an amount approximately equal to the length of the SMR reactor 42. This allows the recuperator cylinder 56 to function as the previously mentioned inner sleeve 56 for the SMR reactor 42. Similarly, the SMR reactor cylinder 44 can extend past its fins 46,48 so that it functions as the outer sleeve 44 for the recuperator 36.

In the fully assembled fuel processor 20, the steam reformer feed 34 flows through the outer fin 70 of the recuperator 36, then passes through the inner (steam reforming catalyst coated) fin 46 of the SMR reactor 42, where it is converted to a hydrogen rich reformate 32. The reformate flow 32 is then baffled so that upon exiting the steam reforming fin 46 it turns upward and passes along the inner surface 78 of the extended recuperator cylinder 56 and flows up through the inner fin 72 of the recuperator 36, where it transfers heat to the incoming steam reformer feed 34.

The water-gas shift (WGS) reactor 38 is a cylindrical catalyst-coated monolith 84 which is encased in insulation 86 and is located within the inner sleeve 80 of the recuperator 36. The reformate flow 32 exits the recuperator 36 towards the top of the pressure vessel 54, where it is forced to reverse direction due to a domed head 88 which separates the reformate 32 from the preheated steam reformer feed 34 entering the pressure vessel 54. The reformate 32 flows down through the WGS monolith 84 at the center of the cylinders 80 and 90. Upon exiting the WGS reactor 38, the reformate flow 32 is diverted towards the walls 44,92 of the pressure vessel 54 and passes through a combustor preheater 94.

The construction of the combustor preheater 94 is very similar to that of the SMR reactor 42 and the recuperator 36, with highly augmented fin structures 96,98 (such as a louvered fin) brazed to both the outside and inside surfaces 100,102 of the cylinder 92. As was the case with the reactor 42, the cylinder 92 serves as a part of the pressure vessel 54 and is welded to the SMR reactor cylinder 44. The reformate 32 passes through the fin 98 on the inside surface 102 of the preheater 94, and transfers heat to the combustor feed gases 40 which pass through the fin 96 on the outer surface 100 of the preheater 94 in a countercurrent direction. Upon exiting the fin 96, the reformate 32 passes over a water preheater 104, which consists of a coiled tube 106 through which the water 26 for the steam reformer 28 is flowing. It is expected that the reformate 32 is cooled in these preheaters 94, 104 to such an extent that some water is condensed out of the reformate 82. Downstream of the water preheater 104, the reformate 32 (and any condensate) reach the bottom dome 108 of the pressure vessel 54 and exit the vessel 54 to pass to a heat exchanger 110 which cools the reformate 32 down to a temperature appropriate for the PSA 22. The heat removed from the reformate 32 in this heat exchanger 110 is considered to be waste heat, and can be discharged to the surrounding ambient.

The hydrogen-depleted off gas 21 from the PSA, now at near-atmospheric pressure (~1 psig), is mixed with the combustor air 112 to comprise the combustor feed 40. This feed gas 40 passes into the low-pressure cylinder 60 and flows up through the combustor preheater 94 and into the fin 50 on the outer surface 52 of the SMR reactor 42. The combustor feed 40 flows vertically up though this catalyst-coated fin 50, counter-current to the flow 32 passing through the fin 46 on the inner surface 48 of the SMR reactor 42. The hydrogen, methane, and carbon monoxide in the combustor feed 40 are catalytically combusted as the flow passes through the fin 50. The heat generated is conducted through the cylindrical wall 44 of the SMR reactor 42 and feeds the endothermic steam reforming reaction occurring on the fin 46 attached to the inside surface 48 of the SMR reactor 42.

Figure 7:
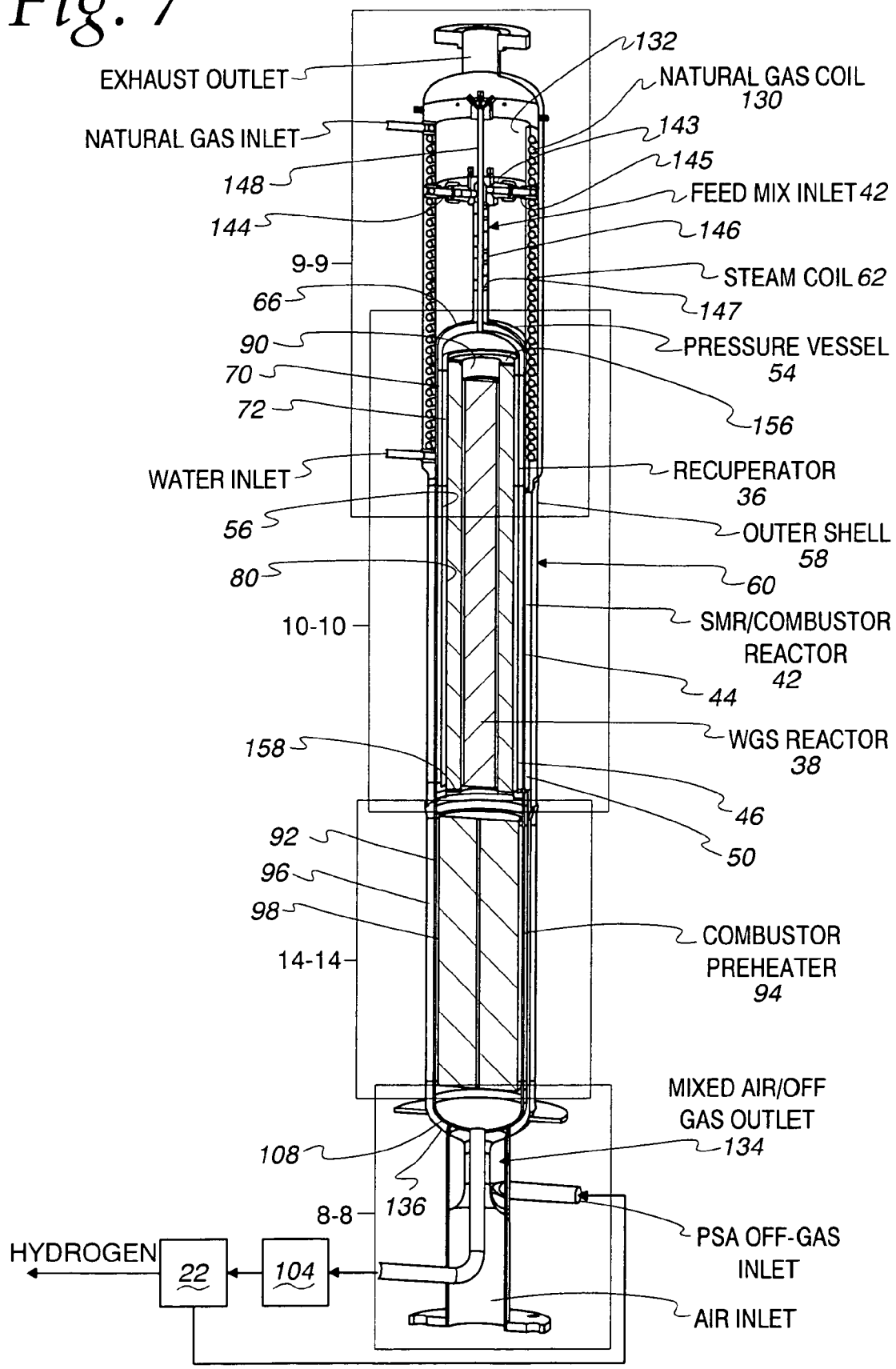
FIG. 7 is a sectioned, perspective view from above of another embodiment of an integrated fuel processing unit of the invention.

Upon exiting the fin 50 of the reactor 42, the combustor exhaust gas 24 continues to flow upward through the annular region between the low-pressure and high-pressure cylinders 44,60, passing over the water vaporizer 29 and natural gas preheater 31. The water vaporizer 29 and natural gas preheater 31 consist of the coiled tube 62 which resides within the annular space between the cylinders 44,60. The preheated liquid water 26 enters the coiled tube 62 at the bottom and flows upward, receiving heat from the high-temperature combustor exhaust 24 which is flowing over the tube 62. As the water passes through the tube 62, it is fully vaporized and then mildly superheated. The natural gas 30 enters the coiled tube 120 at some point along the length of the coil 62, and mixes with the superheated steam. Both fluids are then further heated by the combustor exhaust in the remaining length of the coiled tube 62, after which they are piped into the high-pressure vessel 54. An alternative design (best seen in FIGS. 7 and 9) would have the natural gas 30 preheated in a separate coiled tube downstream (with respect to the combustor exhaust flow 24) of the water coil, and the two fluids would be mixed after exiting their respective coiled heat exchangers.

A large percentage of the combustion reaction typically occurs over a relatively small initial length of the catalyst region. It can be advantageous to force the combustion reaction to be more evenly distributed over the length of the reactor 42. Since the combustion reaction is diffusion-limited, this can be achieved to some extent by having an initial region where the convoluted fin structure 50 is uninterrupted, thus providing a more laminar flow which minimizes diffusion, and an exit region in which the convoluted fin structure 50 is turbulated by the use of louvers, slits, lances, etc. to promote greater diffusion of the reactants for final cleanup of the methane, hydrogen, and carbon monoxide.

Figure 6:
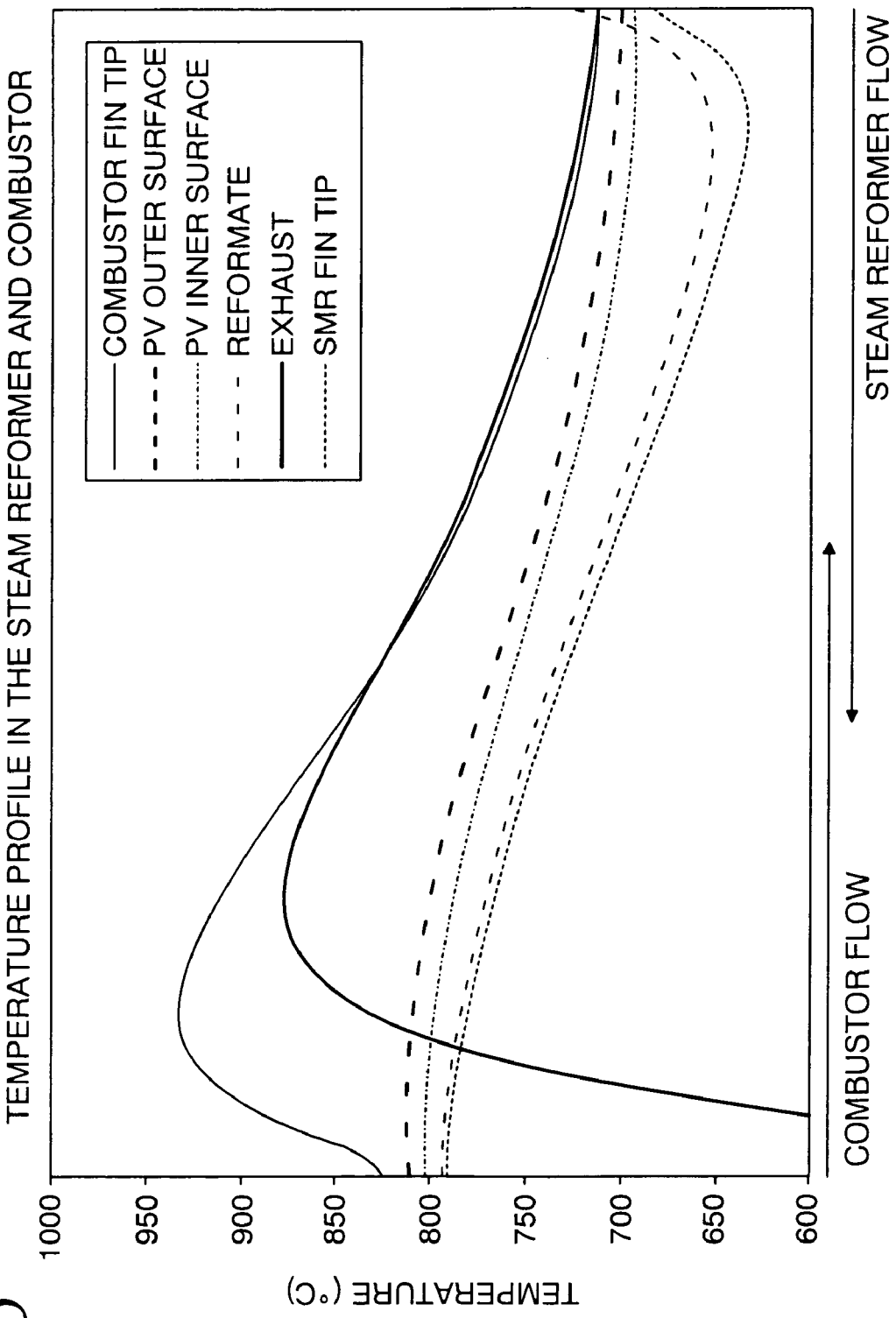
FIG. 6 is a temperature versus flow path graph showing the temperature profile for one embodiment of the steam reformer/combustor of FIG. 2.

FIG. 6 illustrates the expected typical temperature profile within the SMR reactor 42. The SMR feed 32,34 is flowing from right to left, while the combustor feed 40 flows from left to right. The temperatures at the extreme tips of the fins 46 and 50, as well as the temperature on either surface of the cylinder wall 44, are also depicted. It can be seen in the graph that the heat transfer within the SMR reactor 42 is sufficient to keep the metal temperatures well below 1000° C. The ability to run the SMR flow 32,34 and the combustor flow 50 in a counter-current direction without causing dangerously high metal temperatures results in a reformate exit temperature which is substantially higher than the reformate inlet temperature, thus maximizing the conversion of methane to hydrogen and minimizing the required effectiveness of the recuperator 36.

Since this design avoids the need for additional natural gas to be supplied to the combustor 25, the control of the fuel processor 20 can be greatly simplified. Temperatures within the SMR reactor 42 can be controlled by adjusting the combustor air flow 112, based on temperature feedback provided by a sensor (not shown) located on the outer sleeve 58 of the reactor 42 in the area where the peak exhaust gas temperature is expected. Further control is possible by incorporating an adjustable water bypass valve (not shown) of the water preheater 104, so that the temperature of the water 26 being supplied to the vaporizer 29 can be adjusted by varying the percentage of water flow through the preheater 104. Feedback from a temperature sensor located at the inlet 122 to the WGS reactor 38 could potentially be used as the control source for this valve.

The high degree of thermal integration results in a volumetrically compact high-pressure vessel 54, thus minimizing the wall thickness required for a vessel operating at the elevated temperatures and pressure required for the application. One preferred embodiment of the fuel processor 20 described in this application has a pressure vessel 54 which is 6 inches in diameter, with a total length of approximately 40 inches, and is expected to be capable of reforming 6.25 kg/hr of natural gas with a hydrogen production efficiency of 77.5% (the LHV of the hydrogen removed by the PSA, assuming 75% of the hydrogen in the reformate is removed, divided by the LHV of the natural gas feed), resulting in a hydrogen production rate of 1.87 kg/hr.

Another embodiment of the fuel processing unit 20 is shown in FIGS. 7-16. This embodiment differs from that of FIGS. 2-4 in that:

(a) the water preheater 104 has been moved from the integrated unit 20 to an external location and the combustor preheater 94 extends over the region previously occupied by the water preheater 104;

(b) the PSA off gas inlet and the reformate outlet, together with the region associated therewith, have been modified; and (c) a separate coiled tube 130 for the natural gas preheater 31 has been added downstream from the coiled tube 62 for the water vaporizer 29.

Figure 8:
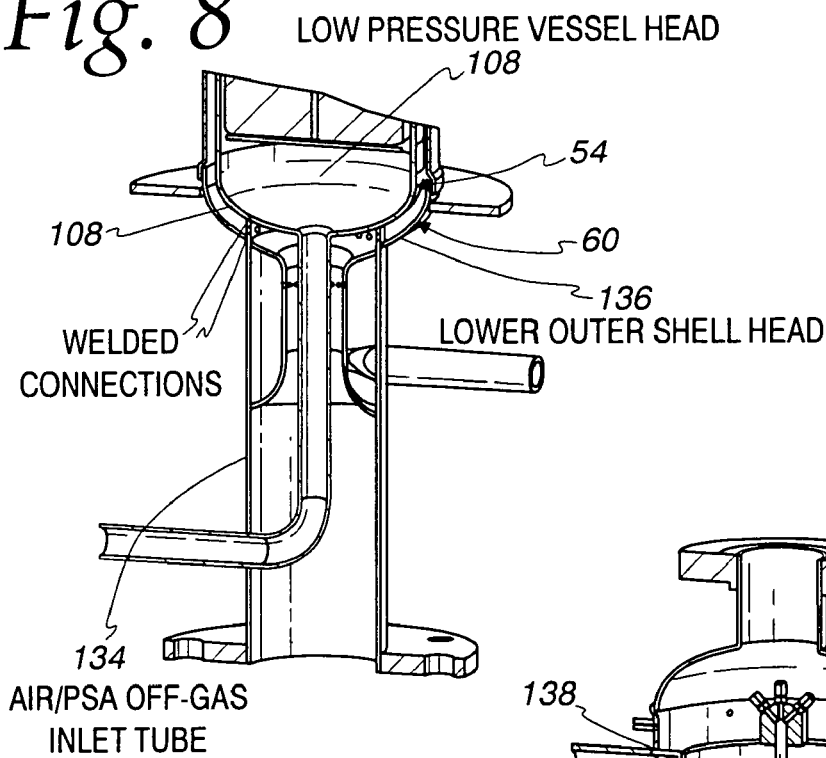
FIG. 8 is an enlarged section view of the portion encircled by line 8-8 in FIG. 7 and highlighting selected components of the integrated fuel processing unit.
Figure 9:
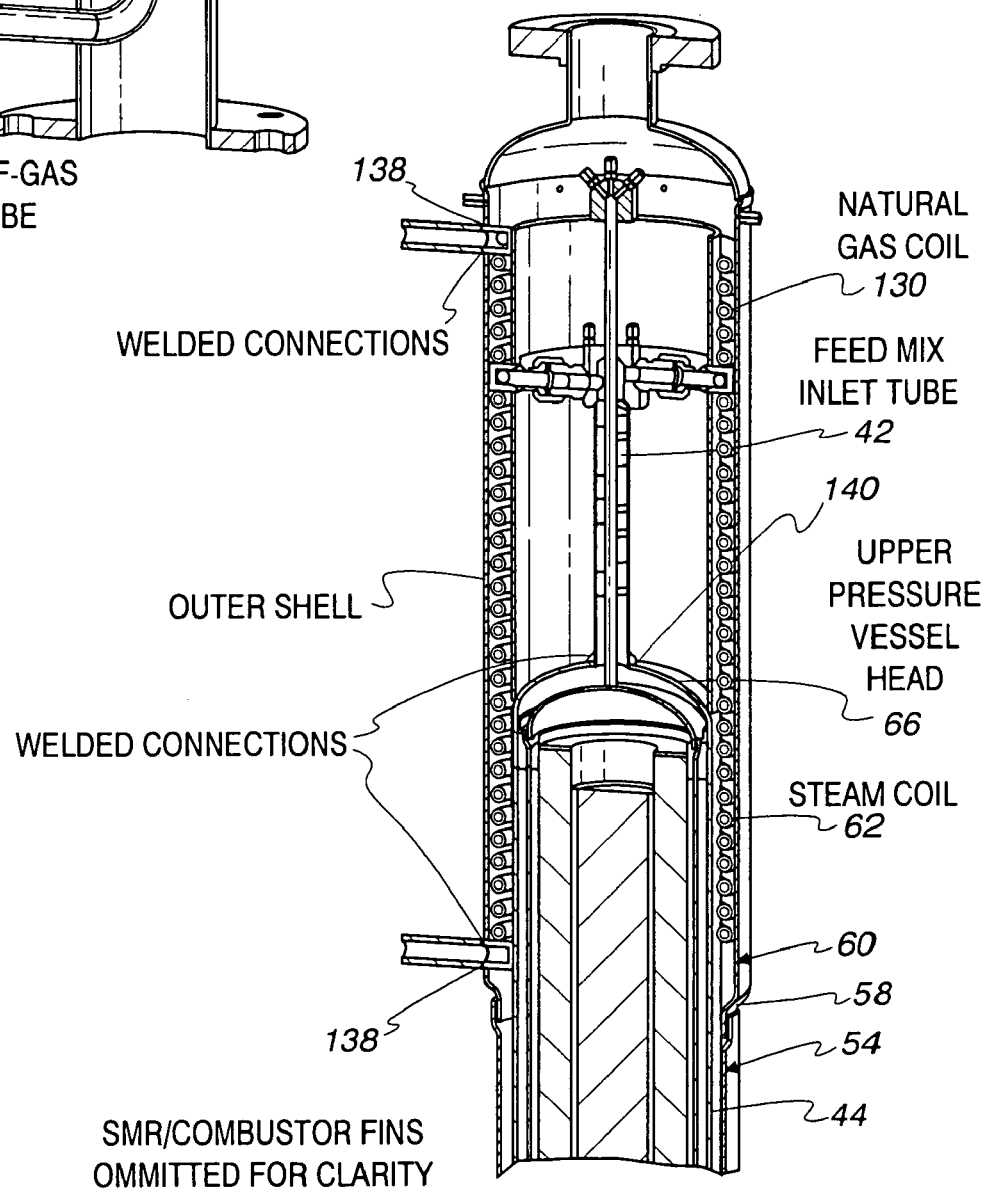
FIG. 9 is an enlarged section view of the portion encircled by line 9-9 in FIG. 7 and highlighting selected components of the integrated fuel processing unit.

As in the fuel processing unit 20 of FIG. 3, the fins 46,50 of the SMR reactor 42 are brazed to the cylinder 44 only and the fins 96,98 of the combustor preheater 94 are brazed to the cylinder 92 only, with the cylinders 44 and 92 being welded at their adjacent ends to form the cylindrical wall of the high-pressure vessel 54. Further, as with the embodiment of the fuel processing unit 20 of FIG. 3, a cylindrical baffle or wall 132 is used to extend the inner boundary of the flow path for the combustor exhaust 24 through the portion of the coils 62,130 that extend beyond the top 66 of the pressure vessel 54. This cylindrical baffle 132 is tack welded to the top 66 of the pressure vessel 54, but does not contact the coils 62,130 or the low pressure vessel 60. Accordingly, the high-pressure vessel 54 and the low-pressure vessel 60 are mechanically coupled in only two locations. The first, best seen in FIG. 8, is near the bottom of the pressure vessel 54 where an Air/PSA off-gas inlet structure 134 is welded to both the lower dome-shaped head 108 for the high-pressure vessel 54 and a lower dome-shaped head 136 for the low-pressure vessel 60 to form a rigid connection. The second location is near the top of the fuel processing unit 20, as best seen in FIG. 9, where the coils 62,130 are welded at first locations 138 to the low-pressure vessel 60 and at a second location 140 to the dome-shaped top head 66 of the high pressure vessel 54 via a feed mix inlet tube structure 142. The structure 142 includes a feed mix inlet manifold 143 that is connected to respective outlet ends 144 and 145 of the coils 62 and 130 by suitable fitting connections, and a downwardly extending mixing tube 146 with an internal mixing structure 147 (also shown in the illustrated embodiment is a central instrumentation tube 148 which may optionally be eliminated for production units). This second connection is far from rigid, being made through what are in effect two large springs (the coils 62,130). Accordingly, the high-pressure vessel 54 and the low-pressure vessel 60 are largely unconstrained in the axial direction relative to each other, and although the outer shell 58 of the vessel 60 will tend to run hotter, the differential thermal expansion should not generate significant stress.

Figure 10:
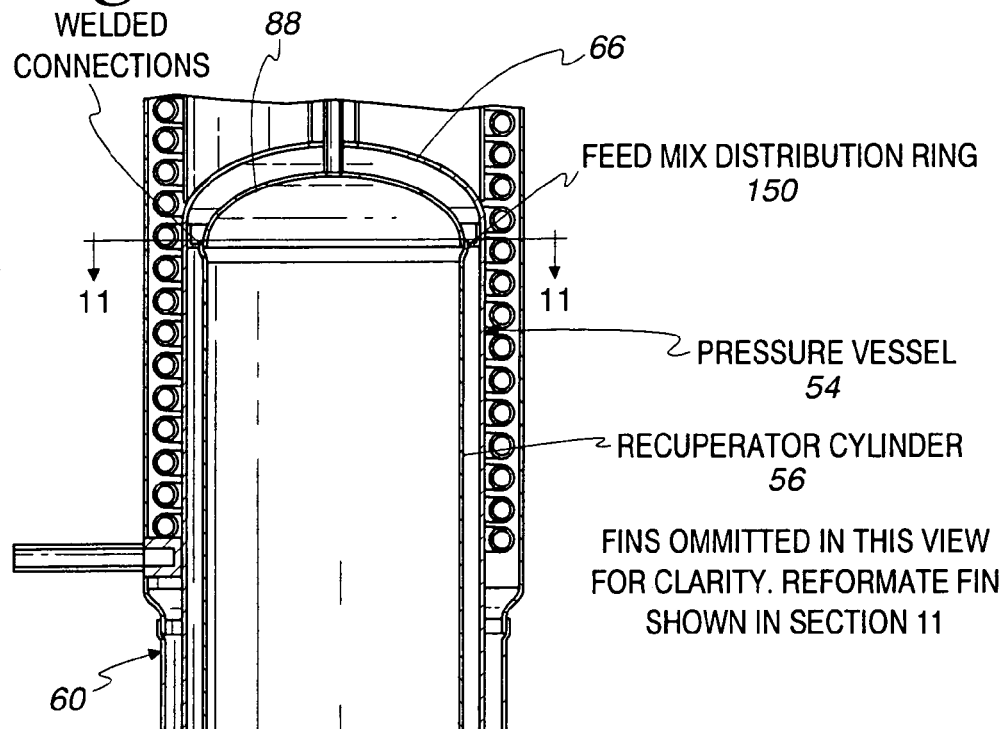
FIG. 10 is an enlarged section view of the portion encircled by line 10-10 in FIG. 7 and highlighting selected components of the integrated fuel processing unit.
Figure 11:
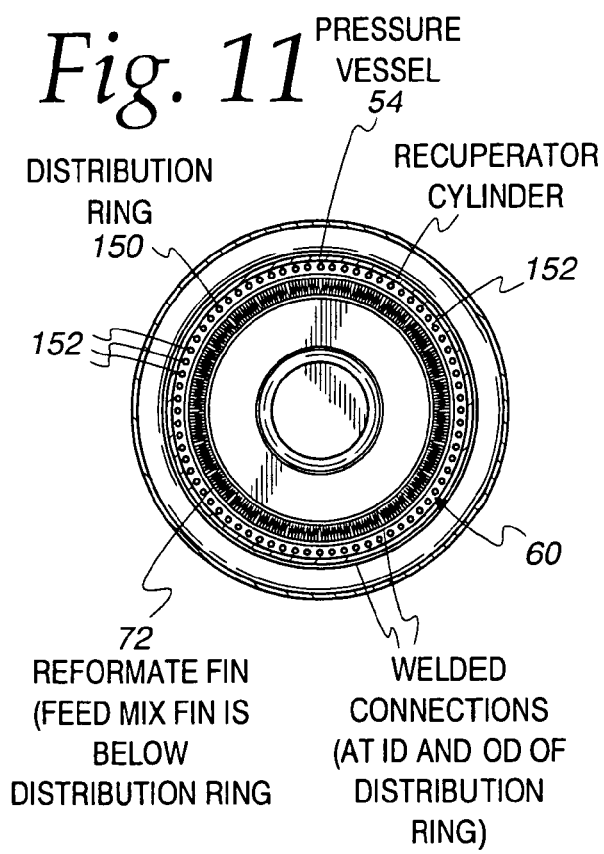
FIG. 11 is a section view taken from line 11-11 in FIG. 10.

As with the embodiment of the fuel processing unit 20 of FIG. 3, the fins 70, 72 of the recuperator 36 are brazed to the recuperator cylinder 56 only, not to the high-pressure vessel 54 or the adjacent inboard surfaces. As best seen in FIG. 10, the high-pressure vessel 54 and recuperator cylinder 56 are mechanically coupled at the top end only, where both are welded to a feed mix distribution ring 150 that serves to mount the dome head 88 and cylinder 56 to the high-pressure vessel 54. As best seen in FIG. 11 the feed mix distribution ring 150 includes a plurality of angularly spaced holes 152 which allow the steam reformer feed 34 to pass through to the recuperator 36 and the SMR reactor 42. Because the components 54,56 are connected at only one end, they are free to move independently in response to differential thermal expansion, and accordingly should not generate significant stress as a result thereof.

Figure 12:
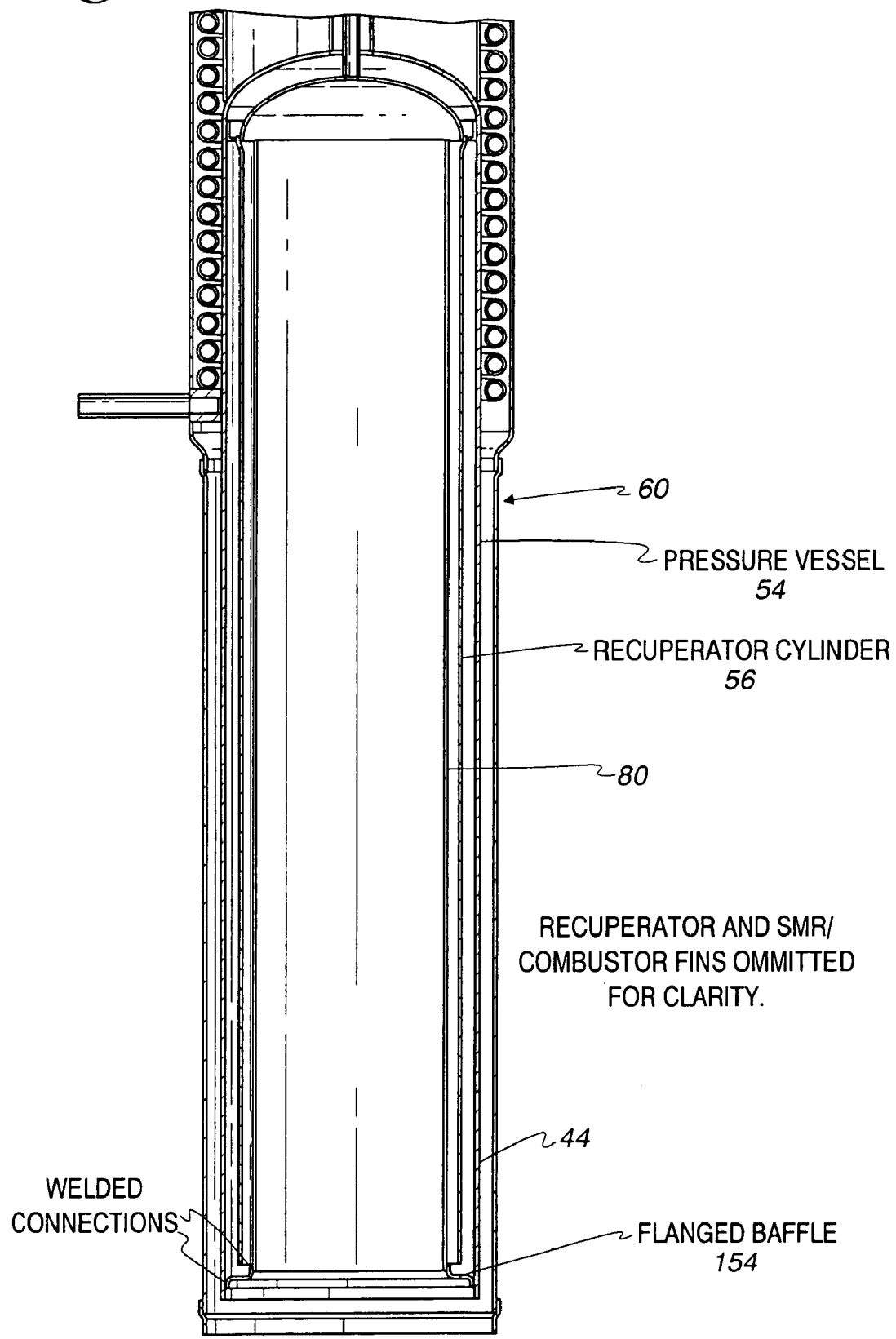
FIG. 12 is a view similar to FIG. 10, but highlighting other components of the integrated fuel processing unit.

Preferably, the inboard cylinder 80 does not contact the fins 70, 72 or the cylinder 78, but rather is connected to the inside of the cylinder 44 of the pressure vessel 54 via a flanged, ring-shaped baffle 154 that is welded to both of the cylinders 44 and 80, as best seen in FIG. 12. Because the inboard cylinder 80 and the high-pressure vessel 54 are only connected at one location, they are free to move independently of one other in response to differential thermal expansion and therefore should not generate significant stresses.

Figure 13:
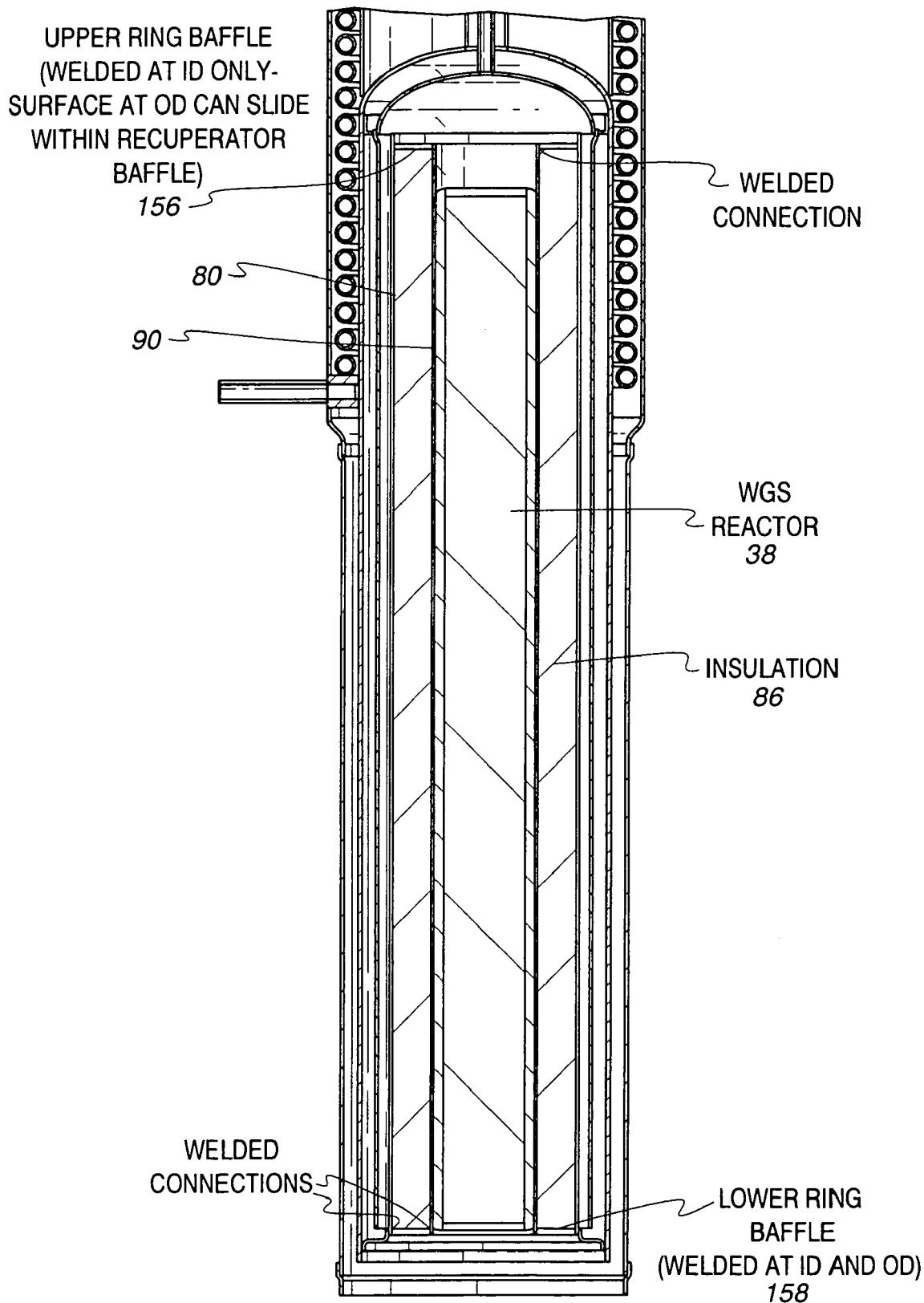
FIG. 13 is a view similar to FIGS. 10 and 12, but again highlighting yet other components of the integrated fuel processing unit.

As with the embodiment of the fuel processor 20 of FIG. 3, the cylindrical wall 90 of the WGS reactor 38 is connected to the inboard cylinder 80 by a pair of flat, ring-shaped baffles 156, 158 welded to both ends of the WGS cylinder 90, as best seen in FIG. 13. The baffle 158 located at the bottom is also welded to the inside of the inboard cylinder 80. Because the annulus between the WGS cylinder 90 and the inboard cylinder 80 is not a flow channel, the annulus does not require a gas-tight seal at both ends. Because the upper ring-shaped baffle 156 is free to move relative to the inboard cylinder 80, the cylinders 80 and 90 can move relative to each other in response to differential thermal expansion and therefore should not generate significant stresses.

As with the embodiment of the fuel processing unit 20 of FIG. 3, the central volume of the combustor preheater region is occupied by a cylindrical enclosure 160 that is preferably filled with insulation, as best seen in FIG. 14. A castellated disc 162 is welded to the bottom of the enclosure 160 and to the inside of the cylinder 92 of the pressure vessel 54. As best seen in FIG. 15, angularly spaced notches 164 are provided in the perimeter of the disc 162 in order to allow passage of the reformate flow 32. Preferably, the enclosure 160 is not attached to the fins 98. Again, because the enclosure 160 and the pressure vessel 154 are connected only at one end, they can move independently in response to differential thermal expansion and accordingly should not generate significant stresses as a result thereof.

Figure 16:
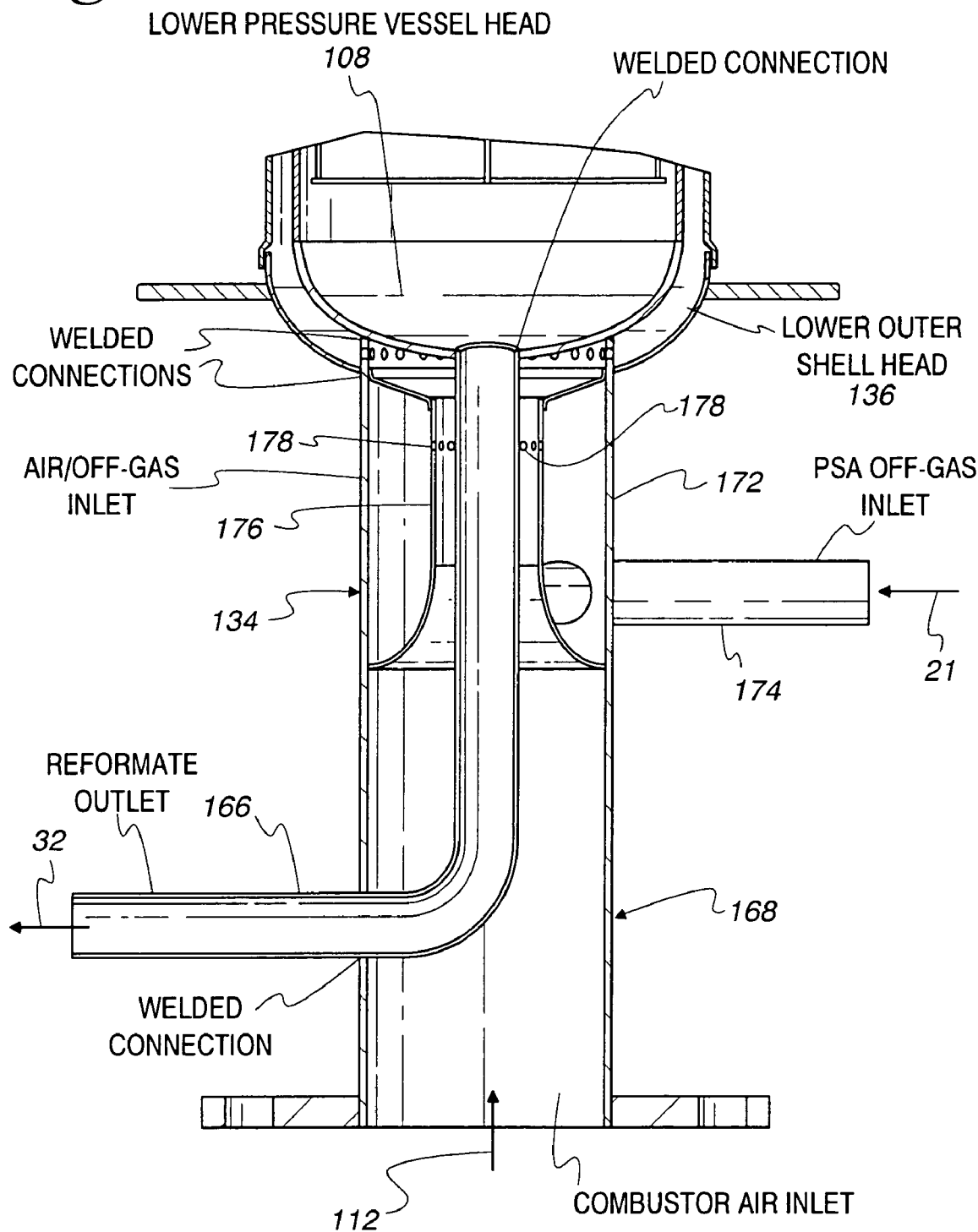
FIG. 16 is a view similar to FIG. 8, but highlighting other components of the fuel processing unit.

As best seen in FIG. 16, the reformate flow 32 exits the fuel processing unit via a small diameter tube 166 welded to the lower head 108 of the pressure vessel 54. Combustion air 112 enters at the bottom of the unit 20 via a large diameter tube 168 that is preferably concentric with the pressure vessel 54. A PSA offgas inlet structure 134 includes a tube 172 of the same diameter as the tube 168, a PSA off gas inlet tube 174, and a combustor air flow/PSA offgas injector 176 which includes a plurality of circumferentially spaced holes 178 that inject the PSA offgas into the airflow 112. While the reformate outlet tube 166 and the offgas inlet structure 134 are rigidly connected to each other at two locations, allowing for stresses to develop with differential thermal expansion, there is little temperature difference between the PSA off gas flow 21 and the reformate flow 32. Accordingly, no significant stresses are to be expected.

The invention claimed is:

1. A recuperative heat exchanger for use in a fuel processing system, the heat exchanger transferring heat from a fluid flow at one stage of a fuel processing operation to said fluid flow at another stage of the fuel processing operation, the heat exchanger comprising:
   a structure;
   a cylindrical wall having a first end axially fixed to the structure and a second end that is not fixed axially to the structure;
   a first convoluted fin bonded to a radially inwardly facing side of said wall, the convolutions of the first convoluted fin extending axially to direct said fluid flow through the heat exchanger;
   a second convoluted fin bonded to a radially outwardly facing side of said wall, the convolutions of the second convoluted fin extending axially to direct said fluid flow through the heat exchanger; and
   a flow path over the second end of the wall to direct said fluid flow from one side of the wall to the other side of the wall.

2. The recuperative heat exchanger of claim 1 wherein said fins have surface enhancements.

3. The recuperative heat exchanger of claim 2 wherein said surface enhancements are fin louvers.

4. The recuperative heat exchanger of claim 1 further comprising a cylindrical water-gas shift reactor extending centrally through said heat exchanger at a location radially inward from said first fin.

5. A fuel processing system comprising:

a steam reformer; and a recuperative heat exchanger, the heat exchanger connected to the steam reformer to direct a fluid flow to the steam reformer, the fluid flow being a steam/fuel feed mix to be reformed in said steam reformer into a reformate, the steam reformer connected to the heat exchanger to direct the fluid flow back to the heat exchanger after it has been reformed into said reformate; the heat exchanger comprising:

a structure;

a cylindrical wall having a first end axially fixed to the structure and a second end that is not fixed axially to the structure;

a first convoluted fin bonded to a radially inwardly facing side of said wall, the convolutions of the first convoluted fin extending axially to direct said fluid flow through the heat exchanger;

a second convoluted fin bonded to a radially outwardly facing side of said wall, the convolutions of the second convoluted fin extending axially to direct said fluid flow through the heat exchanger; and a flow path over the second end of the wall to direct said fluid flow from one side of the wall to the other side of the wall.

6. The fuel processing system of claim 5 wherein said fins have surface enhancements.

7. The fuel processing system of claim 6 wherein said surface enhancements are fin louvers.

8. The fuel processing system of claim 5 further comprising a cylindrical water-gas shift reactor extending centrally through said heat exchanger at a location radially inward from said first fin.

* * * * *